(12) United States Patent
Bickley

(10) Patent No.: US 8,789,353 B2
(45) Date of Patent: Jul. 29, 2014

(54) FUEL SYSTEM

(75) Inventor: Daniel James Bickley, Solihull (GB)

(73) Assignee: Goodrich Control Systems (GB)

( * ) Notice: Subject to any disclaimer, the term of this patent is extended or adjusted under 35 U.S.C. 154(b) by 1556 days.

(21) Appl. No.: 12/046,824

(22) Filed: Mar. 12, 2008

(65) Prior Publication Data

US 2008/0236549 A1    Oct. 2, 2008

(30) Foreign Application Priority Data

Mar. 27, 2007 (GB) .................................. 0705850.6

(51) Int. Cl.
*F02C 9/00* (2006.01)
*F02C 1/00* (2006.01)
*F02C 7/22* (2006.01)

(52) U.S. Cl.
USPC ............................. 60/39.281; 60/734; 60/790

(58) Field of Classification Search
USPC ................ 60/734, 739, 776, 793, 39.24, 790, 60/39.281, 741
See application file for complete search history.

(56) References Cited

U.S. PATENT DOCUMENTS

| | | | | | |
|---|---|---|---|---|---|
| 3,280,533 | A | * | 10/1966 | Hall ................................ | 53/119 |
| 3,686,859 | A | * | 8/1972 | White ............................. | 60/790 |
| 3,686,860 | A | * | 8/1972 | White .......................... | 60/39.25 |
| 3,721,088 | A | * | 3/1973 | Lewis ........................ | 60/39.281 |
| 3,808,801 | A | * | 5/1974 | Taylor ........................ | 60/39.281 |
| 3,930,365 | A | * | 1/1976 | Smith .............................. | 60/790 |
| 3,956,889 | A | * | 5/1976 | Smith ........................ | 60/39.281 |
| 3,991,569 | A | * | 11/1976 | Smith ........................ | 60/39.281 |
| 4,040,599 | A | * | 8/1977 | Smith .............................. | 251/28 |
| 4,074,521 | A | * | 2/1978 | Smith ........................ | 60/39.281 |
| 4,245,964 | A | | 1/1981 | Rannenberg | |
| 4,608,820 | A | * | 9/1986 | White et al. ............... | 60/39.281 |
| 4,612,616 | A | * | 9/1986 | Binns et al. ................... | 701/100 |
| 5,086,617 | A | * | 2/1992 | Smith ........................ | 60/39.281 |
| 5,513,493 | A | * | 5/1996 | Severn et al. .............. | 60/39.281 |
| 5,709,079 | A | * | 1/1998 | Smith ........................ | 60/39.281 |
| 5,715,674 | A | * | 2/1998 | Reuter et al. ............... | 60/39.281 |
| 5,845,484 | A | * | 12/1998 | Maker ........................ | 60/39.281 |
| 6,412,271 | B1 | * | 7/2002 | Maker et al. ................. | 60/39.08 |
| 6,446,437 | B1 | * | 9/2002 | Smith ............................ | 60/734 |
| 6,526,743 | B2 | * | 3/2003 | Smith et al. ............... | 60/39.281 |
| 6,584,762 | B2 | * | 7/2003 | Snow et al. ..................... | 60/204 |
| 7,234,293 | B2 | * | 6/2007 | Yates et al. ................. | 60/39.281 |
| 2005/0016176 | A1 | * | 1/2005 | Griffiths et al. ................ | 60/734 |
| 2005/0262824 | A1 | * | 12/2005 | Yates et al. ................. | 60/39.281 |
| 2007/0113554 | A1 | * | 5/2007 | Yates et al. ..................... | 60/734 |

FOREIGN PATENT DOCUMENTS

EP      1 662 117      5/2006

* cited by examiner

*Primary Examiner* — Gerald L. Sung
(74) *Attorney, Agent, or Firm* — Cantor Colburn LLP

(57) ABSTRACT

A fuel system comprises a first, variable displacement fuel pump operable to supply fuel through a metering valve to an engine, a control servo operable to control the operation of the first pump, a pressure drop control valve (PDCV) responsive to a pressure drop across the metering valve, a second fuel pump, and a spill valve movable between an open position in which substantially all of the fuel supplied by the second fuel pump is returned to an inlet side thereof, and a closed position, or partially closed position, wherein a proportion of the fuel supplied by the second pump is delivered to the engine.

8 Claims, 1 Drawing Sheet

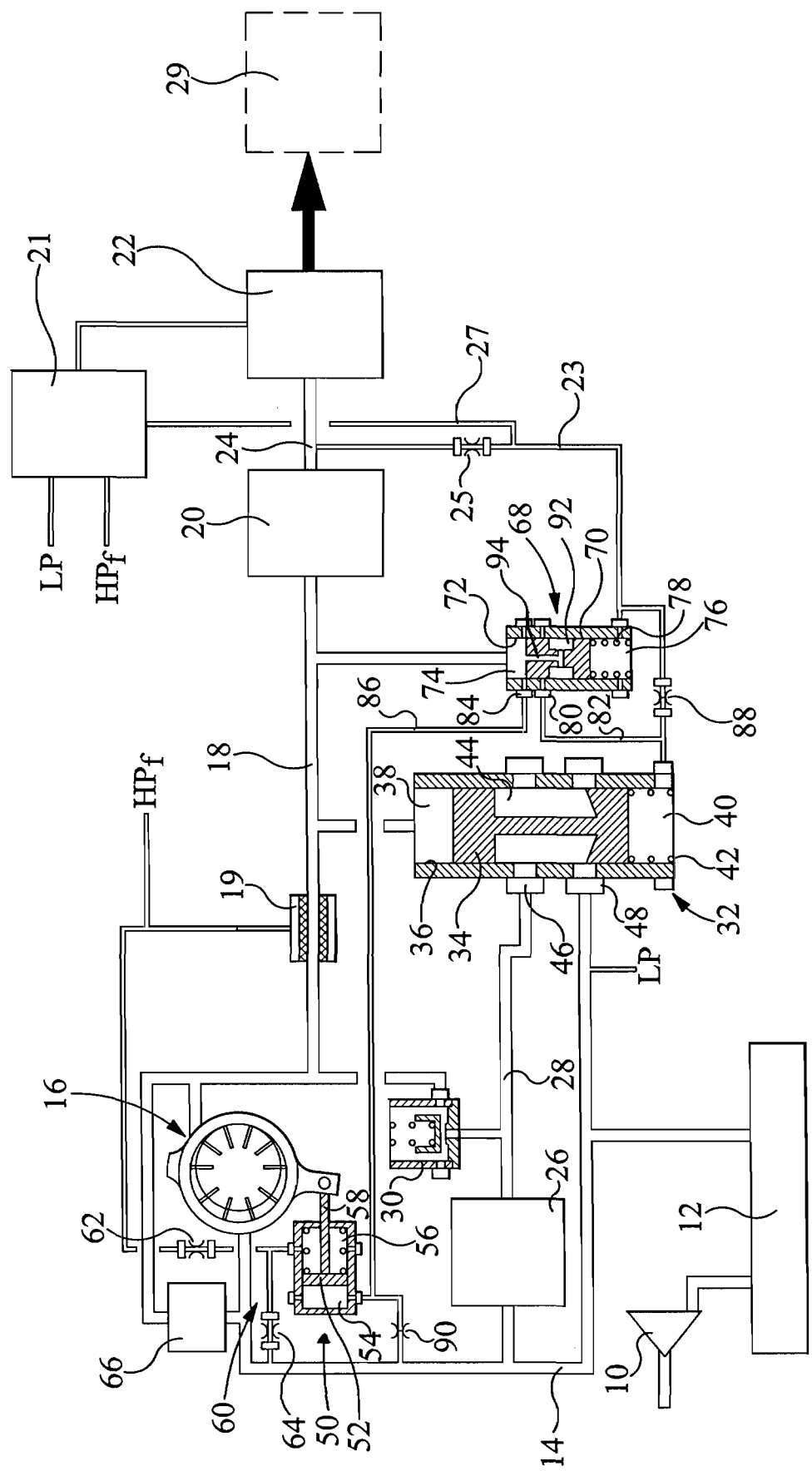

FUEL SYSTEM

This invention relates to a fuel system, and in particular to a fuel system for use in supplying fuel to an aircraft engine.

A number of fuel systems are known in which a pair of fixed displacement pumps are driven at a speed related to the engine operating speed, the outputs of the two pumps being supplied, through appropriate control valve arrangements, to a metering valve controlled to ensure that fuel is supplied to the engine at the desired rate. In such arrangements, particularly during idle descent conditions, the rate at which fuel is delivered by the pumps exceeds the rate at which it is required to be supplied to the engine, and the control valve arrangement operates to return a proportion of the fuel back to the low pressure inlet side of the fuel pumps. For example, the entire output of one of the pumps and part of the output of the other of the pumps may be returned in some operating conditions. Various arrangements of this general type are described in U.S. Pat. No. 4,245,964 and US 2005/0262824. The repeated pumping and subsequent returning of fuel back to the inlet side of the pump results in the temperature at which fuel is supplied to metering valve and engine increasing, and this is undesirable.

EP 1662117 describes a fuel system in which a pair of gear pumps are provided, a switching valve being arranged to control whether the gear pumps are connected in series or in parallel. By appropriate control of the switching valve, the pump bearing loads experienced during high pressure cruise conditions can be reduced.

Rather than use fixed displacement pumps, for example gear pumps, it is also known to use variable displacement pumps, for example vane pumps, in supplying fuel to an engine. These pumps have the advantage that, for a given operating speed of the pump, the output thereof can be varied. By ensuring that the rate of fuel supply by the pump substantially matches the engine requirements, the provision of valve arrangements which, in use, return pressurised fuel back to the inlet side of the pump can be avoided. Consequently, less heating of the fuel occurs. U.S. Pat. No. 5,715,674 describes a system including a single variable displacement vane pump having a hydromechanical control arrangement to control the output thereof. U.S. Pat. No. 6,584,762 describes a system having two variable displacement vane pumps. The operation of the pumps is electronically controlled by a FADEC, and a control valve controls the supply of fuel from the pumps to the engine, and the return of fuel to the fuel tanks.

It is an object of the invention to provide a fuel system of relatively simple and convenient form, in which the re-circulation losses, and hence the fuel heating, are minimised.

According to the present invention there is provided a fuel system comprising a first, variable displacement fuel pump operable to supply fuel through a metering valve to an engine, a control servo operable to control the operation of the first pump, a pressure drop control valve (PDCV) responsive to a pressure drop across the metering valve, a second fuel pump, and a spill valve movable between an open position in which substantially all of the fuel supplied by the second fuel pump is returned to an inlet side thereof, and a closed position, or partially closed position, wherein a proportion of the fuel supplied by the second fuel pump is delivered to the engine, in use.

The PDCV may be operable to control the operation of both the control servo and the spill valve.

The second pump may comprise a fixed displacement pump, for example a gear pump, or a vane pump.

Conveniently the spill valve comprises a spool slidable within a bore and having a first end surface exposed to metering valve inlet pressure, and a second end surface exposed to the fuel pressure within a first control chamber, the PDCV being operable to control the first control chamber pressure.

The control servo conveniently comprises a piston slidable within a bore and having a first surface exposed to a reference pressure, and a second surface exposed to the fuel pressure within a second control chamber, the PDCV being operable to control the second control chamber pressure. The reference pressure is conveniently governed by a pressure potentiometer network connected between metering valve inlet pressure and low pressure.

The pressure drop control valve conveniently comprises a spool slidable within a bore between a first position in which a first control port thereof is open and a second control port thereof is closed, and a second position in which the second control port is open and the first control port is closed. In use, the spool will typically occupy an intermediate position in which it varies and controls the pressures in both of the first and second control chambers. The first control port preferably communicates with the first control chamber and the second control port preferably communicates with the second control chamber.

The spool of the PDCV conveniently defines a gallery which communicates through an internal passage with a chamber defined by one end of the spool and the associated bore. Conveniently, depending upon the axial position of the spool the first control port communicates with the gallery.

The invention further relates to a fuel system comprising a variable displacement pump, and a control servo operable to control the operation thereof, the control servo comprising a piston sidable within a bore and having a first surface exposed to a reference pressure, and a second surface exposed to the fuel pressure within a control chamber, the reference pressure being governed by a pressure potentiometer network connected between a metering valve inlet pressure and low pressure.

The invention will further be described, by way of example, with reference to the accompanying drawing, FIG. 1, which is a diagrammatic illustration of a fuel system in accordance with one embodiment of the invention.

The fuel system illustrated in FIG. 1 comprises a low pressure boost pump 10 arranged to supply fuel through a heat exchanger 12 to a low pressure line 14. A first high pressure pump 16 in the form of a variable displacement vane pump is used to supply fuel from the low pressure line 14 to a supply line 18. From the supply line 18, fuel is supplied through a metering valve 20 to a pressure raising and shut-off valve (PRSOV) 22 and from there to the manifold of an associated engine 29. A delivery line 24 interconnects the metering valve 20 and PRSOV 22. A shut-off control arrangement 21 is operable to close the PRSOV 22, when desired.

The fuel system further comprises a second pump 26, conveniently a fixed displacement pump for example a gear pump or vane pump, arranged to supply fuel from the low pressure line 14 to a feed line 28. The feed line 28 communicates via a spring biased non-return valve 30 with the supply line 18 such that when the fuel pressure within the feed line 28 exceeds a predetermined level determined, in part, by the spring loading of the valve 30 and by the pressure within the supply line 18, the non-return valve 30 will open to allow fuel to flow from the feed line 28 to the supply line 18.

The fuel system further comprises a spill valve 32 operable to control communication between the feed line 28 and low pressure line 14. The spill valve 32 comprises a spool 34 slidable within a bore 36 formed in a housing. A first end of the spool 34 defines, with the bore 36, a chamber 38 which is connected to the supply line 18 and thus, in use, is exposed to fuel at relatively high pressure. A second end face of the spool 34 forms with the bore 36 a first control chamber 40. The first control chamber 40 contains a spring 42 arranged to bias the spool 34 in an upward direction, in the orientation illustrated The spool 34 is shaped to define an annular gallery 44 which communicates, in use, with a port 46 connected to the feed line 28 and, depending upon the position of the spool 34, with a port 48 connected to the low pressure line 14. It will be appreciated that when the chamber 38 is at relatively high pressure compared to the first control chamber 40, the spool 34 will occupy a lowermost position in the bore 36, in the orientation illustrated in FIG. 1, in which both the ports 46, 48 are fully open, the annular gallery 44 defining a flow path therebetween. Thus fuel from the feed line 28 can flow through the gallery 44 to the low pressure line 14. Consequently, the second pump 26 is unloaded. When the first control chamber 40 is at a higher pressure, the spool 34 will occupy a position upwards of the aforementioned lowermost position in which the port 48 is closed or partially closed by the spool 34, as indicated in FIG. 1 thereby restricting or preventing fuel flow from the feed line 28 to the low pressure line 14, resulting in the feed line pressure rising and hence, depending upon the feed line pressure, in the delivery of fuel from the feed line 28 to the supply line 18 through the non-return valve 30 as described hereinbefore.

The operation of the first pump 16 is controlled by a control servo arrangement 50 comprising a piston 52 slidable within a bore and defining, with the bore, a second control chamber 54 and a reference chamber 56. A rod 58 connected to the piston 52 co-operates with part of the pump 16 such that movement of the piston 52 adjusts the operation of the pump 16, varying the volumetric output rate thereof for a given operating speed. In the orientation illustrated, movement of the piston 52 to the right reduces the volumetric output rate of the pump 16 and movement of the piston 52 to the left increases the volumetric output rate of the pump 16.

A fuel pressure potentiometer network 60 made up of a first flow restrictor 62 supplied with flow from a flow washed filter 19 in the supply line 18 and a second flow restrictor 64 connected to the low pressure line 14 is provided, the reference chamber 56 being connected to a line intermediate the two restrictors 62, 64. It will be appreciated, therefore, that the reference chamber 56 is held at a pressure between the pressures in the line 14 and the supply line 18.

A pressure relief valve 66 is provided between the supply line 18 and the low pressure line 14, the pressure relief valve 66 being operable to open in the event that the fuel pressure within the supply line 18 exceeds a predetermined level in order to reduce the risk of damage to the pumps 16, 26.

The fuel pressure within the first and second control chambers 40, 54 is controlled by the operation of a pressure drop control valve (PDCV) 68. The PDCV 68 comprises a spool 70 slidable within a bore 72. A first end of the spool 70 and the bore 72 together define a chamber 74 which communicates with the supply line 18. A second end of the spool 70 and the bore 72 define a third control chamber 76 which communicates with the delivery line 24 via a first interconnecting line 23 and a restrictor 25. The chamber 76 further houses a spring 78 urging the spool 70 in the upward direction in the orientation illustrated. It will be appreciated that the position occupied by the spool 70 is responsive to the pressure drop across the metering valve 20, thus when the pressure difference between the supply and delivery lines 18, 24 is below a predetermined level, the spool 70 will move in an upward direction in the orientation illustrated, the spool moving in a downward direction in the event that the pressure difference between the supply line 18 and delivery line 24 is above the predetermined level.

The PDCV 68 includes a first control port 80 which communicates via a line 82 with the first control chamber 40. The PDCV 68 further includes a second control port 84 which communicates through a line 86 with the second control chamber 54. The first control chamber 40 further communicates via a restriction 88 with the first interconnecting line 23, and the second control chamber 54 communicates via a restriction 90 with the low pressure line 14.

The spool 70 is shaped to define an annular gallery 92 part-way along its length, the gallery 92 communicating via a passageway 94 with the chamber 74. It will be appreciated, therefore, that the gallery 92 is at substantially the same pressure as the supply line 18.

In use when the spool 34 of the spill valve 32 occupies its lowermost position in the bore 36, as described hereinbefore, in which both ports 46, 48 are fully open, the feed line 28 is at a relatively low pressure and little, if any, fuel flows from the feed line 28 through the non-return valve 30 to the supply line 18. In this operating condition, the second pump 26 is unloaded and minimal heating of the fuel output from this pump, which is re-circulated back to the low pressure line 14 via the spill valve 32, occurs.

In the condition illustrated in FIG. 1, the spool 34 of spill valve 32 occupies a position in the bore 36 in which communication between the feed line 28 and the low pressure line 14 via ports 46, 48 and annular chamber 44 is partially blocked. This results in the fuel pressure in the feed line 28 exceeding the predetermined level, as discussed hereinbefore, at which the non-return valve 30 opens, allowing fuel to flow from the feed line 28 to the supply line 18. In this operating condition, the second pump 26, which is providing a proportion of its fuel output to the supply line 18, is partially loaded. There is some heating of the proportion of the fuel output from pump 26 that is re-circulated via the aforementioned partially blocked and pressurised path through spill valve 32 to the low pressure line 14.

The fuel output from the first pump 16 is delivered to the supply line 18 at all operating conditions irrespective of the output from the second pump 26. The PDCV 68 regulates the supply of fuel to the second control chamber 54, according to the pressure drop across the metering valve 20, thereby controlling the operation of the control servo arrangement 50 to ensure that the first pump 16 supplies fuel at substantially the required rate.

If in use the pressure drop across the metering valve 20 falls below the predetermined regulation level, and hence the spool 70 moves in an upward direction, as described hereinbefore, communication between chamber 74 and line 86 via port 84 will be reduced and communication between chamber 92 and line 82 via port 80 will be increased. The degree of movement of spool 70 is proportional to the deviation in the pressure drop across the metering valve 20 from the predetermined level. The upward movement of spool 70 reduces the pressure in the line 86 and in the second control chamber 54 such that the piston 52 of control servo arrangement 50 is urged to move to the left, as described hereinbefore, to increase the volumetric output of the pump 16.

If the flow requirements of the engine combustion process and ancillary actuation systems are able to be met solely by the increase in volumetric output from pump 16, then the pressure drop across the metering valve 20 is restored by this movement of spool 70 and piston 52. This upward movement of spool 70 increases the pressure in e 82 and the first control chamber 40. However, any resultant movement of the spool 34 of the spill valve 32 in the upward direction, as illustrated, will not be of sufficient magnitude to increase the fuel pressure within the feed line 28 to the predetermined level at which the non-return valve 30 opens, as described hereinbefore.

If the flow requirements of the engine cannot be met solely by pump 16 then spool 70 will continue to move in an upward direction to further reduce the communication between chamber 74 and line 86 via port 84 and further increase the communication between chamber 92 and line 82 via port 80. Piston 52 will subsequently move to maximise the volumetric output of pump 16. Also, the pressure in line 82 and first control chamber 40 will further increase to move spool 34 in an upward direction and reduce communication between the annular gallery 44 and the low pressure line 14, via port 48 in the spill valve 32. This results in the fuel pressure in the feed line 28 of pump 26 increasing to the predetermined level at which the non-return valve 30 opens and fuel flow from pump 26 is fed to the main delivery line 18. The pressure drop across the metering valve 20 is therefore restored by increasing the flow feed to line 18 from both pumps 16 and 26.

If the pressure drop across the metering valve 20 rises above the predetermined regulation level, spool 70 moves in a downward direction, as described hereinbefore, to increase communication between chamber 74 and line 86 via port 84, and reduce communication between chamber 92 and line 82 via port 80. When the flow requirements of the engine are able to be met solely by pump 16, this movement of spool 70 in a downward direction increases the pressure in line 86 and second control chamber 54 such that piston 52 is urged to move to the right, as described hereinbefore, to reduce the volumetric output of pump 16 and the pressure drop across the metering valve 20. The pressure in line 82 and the first control chamber 40 is reduced by this downward movement of spool 70. However, this has no effect on the position of spool 34, since it already occupies its lowermost position in the bore 36 of the spill valve 32.

When the volumetric output of pump 26, as well as pump 16, is being used to meet the flow requirements of the engine, the spool 34 occupies a position in the bore 36 in an upward direction from its lowermost position, as described hereinbefore. With the spool 34 in this position, a relatively small increase in the pressure drop across the metering valve 20, which results in a relatively small downward movement of spool 70 and reduction of pressure in line 82 and first control chamber 40, will result in movement of spool 34 in a downward direction towards its lowermost position. This will result in a larger proportion of the volumetric output of pump 26 being re-circulated back to the low pressure line 14, via ports 46 and 48, and annular chamber 44, in the spill valve 32. Consequently, a smaller proportion of the volumetric output of pump 26 will be fed to supply line 18 through the non-return valve 30. This relatively small movement of spool 70 in a downward direction is insufficient to increase the pressure in line 86 and second control chamber 54 to a level that causes the piston 52 to move away from the position corresponding to maximum volumetric output of pump 16.

When there is a significantly larger increase in the pressure drop across the metering valve 20, the resultant downward movement of spool 70 may be sufficient to raise the pressure in line 86 and the second control chamber 54 to move the piston 52 away from the position corresponding to maximum volumetric output of pump 16. Hence, in this operating condition, the pressure drop across the metering valve 20 is restored by reducing the flow feed to line 18 from both pumps 16 and 26.

It will be appreciated that the arrangement described hereinbefore is advantageous in that the control of a twin pump fuel system in which at least one of the pumps is of the variable displacement type can be achieved in a relatively simple and convenient manner. Additionally, a significant reduction in the quantity of pressurised fuel returned to the low pressure line can be achieved, the feed line 28 being at relatively low pressure during most engine operating conditions, thus heating of the fuel is reduced.

Upon shutting down of the engine, the Electro-Hydraulic Shut-off Valve (EHSV) 21 is energised to connect high pressure (HPf) from the flow washed filter 19 to the PRSOV 22 to terminate the supply of fuel to the engine. Simultaneously the EHSV 21 connects low pressure (LP) from the line 14 via a second interconnecting line 27 to the first interconnecting line 23. As well as providing a communication path between the third control chamber and the delivery line 24, via restriction 25, as described hereinbefore, the first interconnecting line 23 provides a communication path between both the first and third control chambers 40, 76 and the second communication line 27.

The communication path between the low pressure line 14 and the first interconnecting line 23, via the second interconnecting line 27 and the EHSV 21, is configured to be significantly less restrictive than that between the delivery line 24 and the first interconnecting line 23, via the restriction 25, such that the pressure in the first interconnecting line 23 tends to fall to a level approaching LP during the aforementioned shutdown condition. This ensures that the respective pressures in the first and third control chambers 40, 76 also fall to a level approaching LP, which results in the respective spools 34, 70 of the spill valve 32 and PDCV 68 moving to their lowermost positions in their respective bores 36, 72 as described hereinbefore.

The movement of spool 34 to its lowermost position results in an increase in communication between the feed line 28 and the low pressure line 14 via the annular chamber 44 and the ports 46, 48 such that the fuel pressure in the feed line 28 falls below the predetermined level at which the non-return valve 30 closes, fuel flow from the feed line 28 to the supply line 18 ceases and the pump 26 is unloaded. The movement of spool 70 to its lowermost position results in an increase in communication between chamber 74 and line 86 via port 84, such that the pressure in line 86 and the second control chamber 54 increases and the piston 52 of the control servo 50 moves to the right to reduce the volumetric output from pump 16, as described hereinbefore. This ensures that the supply line 18 does not over-pressurise when the PRSOV 22 terminates the supply of fuel to the engine.

Conveniently, the pressure drop control valve and its porting 80, 84 are designed such that the position occupied by spool 70 for modulation of the servo control arrangement 50 is separated from the position required for modulation of the spill valve 32. This is advantageous in that it permits independent control of the operation of the spill valve 32 and the servo control arrangement 50. If there were a position in which both control ports were open, then the operation of one of the spill valve 32 and servo control arrangement 50 could negatively impact on the operation of the other of the spill valve 32 and the servo control arrangement 50.

It will be appreciated that a wide range of modifications and alterations to the arrangement described hereinbefore are possible without departing from the scope of the invention.

The invention claimed is:

1. A fuel system comprising a first variable displacement fuel pump operable to supply fuel through a metering valve to an engine, a control servo operable to control the operation of the first pump, a pressure drop control valve (PDCV) responsive to a pressure drop across the metering valve, a second fuel pump arranged in parallel with said first fuel pump, and a spill valve movable between an open position in which substantially all of the fuel supplied by the second fuel pump is returned to an inlet side of the second fuel pump, and a closed position, or partially closed position, wherein a proportion of the fuel supplied by the second fuel pump is delivered to the engine, via the metering valve, on normal use, to supplement that delivered by the first pump, and wherein the PDCV is operable to control the operation of both the control servo and the spill valve.

2. A system according to claim 1, wherein the second pump comprises a fixed displacement pump.

3. A system according to claim 1, wherein the spill valve comprises a spool slidable within a bore and having a first end surface exposed to metering valve inlet pressure, and a second end surface exposed to the fuel pressure within a first control chamber, the PDCV being operable to control the first control chamber pressure.

4. A system according to claim 1, wherein the control servo comprises a piston slidable within a bore and having a first surface exposed to a reference pressure, and a second surface exposed to the fuel pressure within a second control chamber, the PDCV being operable to control the second control chamber pressure.

5. A system according to claim 4, wherein the reference pressure is governed by a pressure potentiometer network connected between metering valve inlet pressure and low pressure.

6. A system according to claim 1, wherein the PDCV comprises a spool slidable within a bore between a first position in which a first control port thereof is open and a second control port thereof is closed, and a second position in which the second control port is open and the first control port is closed.

7. A system according to claim 6, wherein the first control port communicates with the first control chamber and the second control port communicates with the second control chamber.

8. A system according to claim 6, wherein the spool of the PDCV defines a gallery which communicates through an internal passage with a chamber defined by one end of the spool and the associated bore.

* * * * *